United States Patent
Wagner

(10) Patent No.: US 8,696,277 B2
(45) Date of Patent: Apr. 15, 2014

(54) CAPTIVE FASTENER ASSEMBLY AND MACHINE USING SAME

(75) Inventor: Jeffrey A. Wagner, Delphi, IN (US)

(73) Assignee: Caterpillar Inc., Peoria, IL (US)

( * ) Notice: Subject to any disclaimer, the term of this patent is extended or adjusted under 35 U.S.C. 154(b) by 232 days.

(21) Appl. No.: 13/166,075

(22) Filed: Jun. 22, 2011

(65) Prior Publication Data

US 2012/0324694 A1    Dec. 27, 2012

(51) Int. Cl.
*F16B 41/00*    (2006.01)

(52) U.S. Cl.
CPC ............ *F16B 41/002* (2013.01); *Y10S 411/999* (2013.01)
USPC .......................................... 411/108; 411/999

(58) Field of Classification Search
USPC ................... 411/999, 108, 525, 526
See application file for complete search history.

(56) References Cited

U.S. PATENT DOCUMENTS

| | | | |
|---|---|---|---|
| 2,018,346 A * | 10/1935 | Busby | 70/90 |
| 2,831,520 A * | 4/1958 | Clarke | 411/349 |
| 3,221,589 A * | 12/1965 | Vander Sande et al. | 411/49 |
| 4,612,501 A * | 9/1986 | Costello et al. | 324/207.11 |
| 4,906,153 A | 3/1990 | Duran | |
| 4,948,316 A | 8/1990 | Duran et al. | |
| 5,037,259 A | 8/1991 | Duran et al. | |
| 5,076,747 A | 12/1991 | Cosenza | |
| 5,718,344 A | 2/1998 | Joldeson et al. | |
| 6,095,736 A * | 8/2000 | Miller et al. | 411/352 |
| 6,379,093 B1 | 4/2002 | Bondarowicz et al. | |
| 7,588,386 B2 | 9/2009 | Kielczewski et al. | |
| 7,967,538 B1 * | 6/2011 | Coope et al. | 411/348 |
| 2008/0034597 A1* | 2/2008 | Pfleiderer et al. | 30/382 |
| 2008/0145177 A1 | 6/2008 | Kulesha | |
| 2009/0010704 A1 | 1/2009 | de Jesus et al. | |
| 2009/0197724 A1 | 8/2009 | Young | |
| 2010/0129138 A1 | 5/2010 | Lariviere | |

* cited by examiner

Primary Examiner — Flemming Saether
(74) Attorney, Agent, or Firm — Liell & McNeil

(57) ABSTRACT

A machine includes a threaded fastener connected to, and positioned adjacent, a maintenance feature. A removable cover blocks access to the maintenance feature and includes a captive fastener assembly. The captive fastener assembly includes a barrel with an internal passage separating a tool opening from a fastener opening, and the internal passage is divided into a cage volume and a fastener passage by an internal thrust surface. A retention component that defines a tool passage through a capture surface is mechanically mounted in the barrel adjacent a tool opening. A captured fastener is trapped to move between the capture surface and the internal thrust surface in the cage volume. The captured fastener includes an internal tool engagement surface oriented toward the tool opening and threads oriented toward the fastener opening.

12 Claims, 2 Drawing Sheets

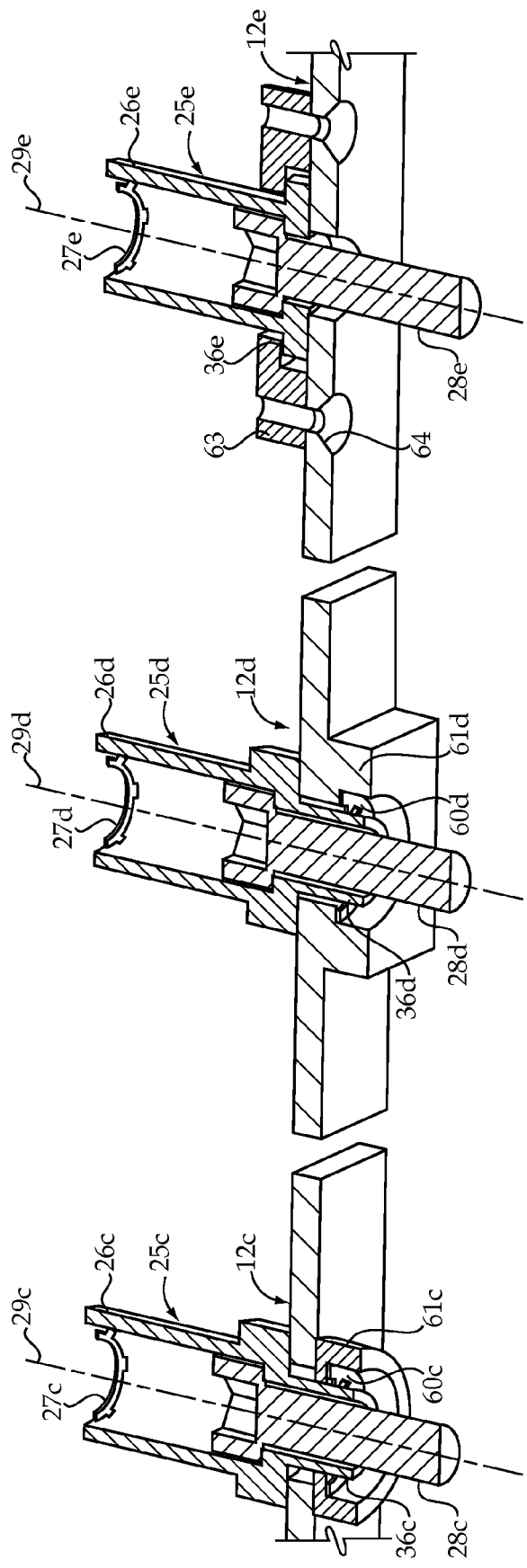

CAPTIVE FASTENER ASSEMBLY AND MACHINE USING SAME

TECHNICAL FIELD

The present disclosure relates generally to a captive fastener assembly, and more particularly to a strategy for preventing loss of a threaded fastener associated with a removable cover of a machine.

BACKGROUND

Many machines include removable covers that block access to some maintenance feature of the machine. During periodic maintenance intervals, the removable cover is detached from the machine so that access to the maintenance feature can be gained and some maintenance procedure performed. For instance, alternators associated with internal combustion engines are often belt driven and include a removable cover or guard that blocks access to the belt. When performing routine maintenance, such as to tighten the belt and/or replace the alternator belt, the removable cover or guard must be detached. During these routine maintenance procedures, there is often the risk that one or more fasteners associated with the removable cover or guard will become lost, often rendering it impossible or extremely inconvenient to find a replacement fastener for reconnecting the cover or guard to the machine. As a result, in some instances the replaceable cover or guard is not reconnected to the machine. Some jurisdictions with authority over certain machines often require that fasteners associated with removable covers be captive so that the fastener stays with the cover when the cover is disconnected from the machine. In some specific circumstances, reconnection of covers may also be problematic in that they may require near simultaneous tightening of two or more fasteners to avoid cover warping or bending and potential breakage of the cover. One example of a captive fastener that is known relates to screws that are connected to a removable cover with spring clips. While such a strategy may work well in many applications, spring clips and screws may not be appropriate for many other applications, such as the alternator belt cover situation described above. U.S. Pat. No. 6,379,093 shows a captive fastener member and system for joining two work pieces that may also be of interest.

The present disclosure is directed toward one or more of the problems set forth above.

SUMMARY OF THE DISCLOSURE

In one aspect, a captive fastener assembly includes a barrel with an internal passage separating a tool opening from a fastener opening. The internal passage is divided into a cage volume and a fastener passage by an internal thrust surface. The barrel includes an external attachment surface, and an external thrust surface located opposite to the internal thrust surface. A retention component that defines a tool passage through a capture surface is mechanically mounted to a surface that defines the internal passage of the barrel at a location adjacent the tool opening. A captured fastener is trapped in the barrel to move between contact with the capture surface and the internal thrust surface in the cage volume. The captured fastener defines an Allen socket oriented toward the tool opening and threads oriented toward the fastener opening. The captured fastener has a guide interaction with the barrel along a common centerline when moving between contact with the capture surface and contact with the internal thrust surface.

In another aspect, a machine includes a threaded fastener connected to, and positioned adjacent, a maintenance feature. A removable cover blocks access to the maintenance feature and includes a captive fastener assembly. The captive fastener assembly includes a barrel with an internal passage separating a tool opening from a fastener opening. The internal passage is divided into a cage volume and a fastener passage by an internal thrust surface. A retention component that defines a tool passage through a capture surface is mechanically mounted to a surface that defines the internal passage at a location adjacent the tool opening. A captured fastener is trapped in the barrel to move between contact with the capture surface and contact with the internal thrust surface in the cage volume. The captured fastener defines an internal tool engagement surface oriented toward the tool opening and threads oriented toward the fastener opening and engaged to the threaded fastener of the machine.

In still another aspect, a method of servicing a machine includes accessing a maintenance feature of the machine by disconnecting a removable cover. The disconnecting step includes unthreading at least one fastener by rotating a tool inserted through a tool opening of a captive fastener assembly. Loss of the fastener is avoided by capturing the fastener in the captive fastener assembly affixed to the removable cover. The capturing step includes trapping the fastener between a retention component mounted to a barrel of the captive fastener assembly and an internal thrust surface of the barrel. Maintenance is then performed to the maintenance feature. Access to the maintenance feature is then blocked by reconnecting the removable cover to the machine. The reconnecting step includes inserting a tool through a tool opening of the captive fastener assembly into engagement with an internal tool engagement surface of the fastener.

BRIEF DESCRIPTION OF THE DRAWINGS

FIG. 3 is a sectioned perspective view of a captive fastener assembly according to another embodiment of the present disclosure;

FIG. 4 is a sectioned perspective view of a captive fastener assembly according to still another embodiment of the present disclosure; and FIG. 5 is a sectioned perspective view of a captive fastener assembly according to still another embodiment of the present disclosure.

DETAILED DESCRIPTION

Figure 1:
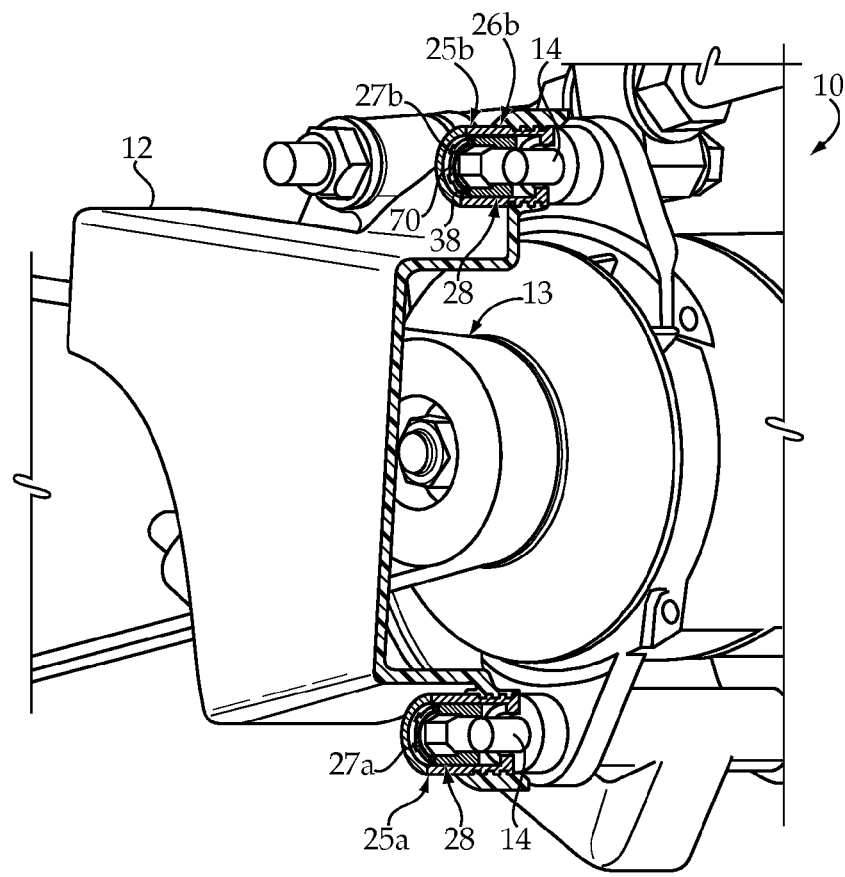
FIG. 1 is a partial perspective view of a machine according to the present disclosure.
Figure 2:
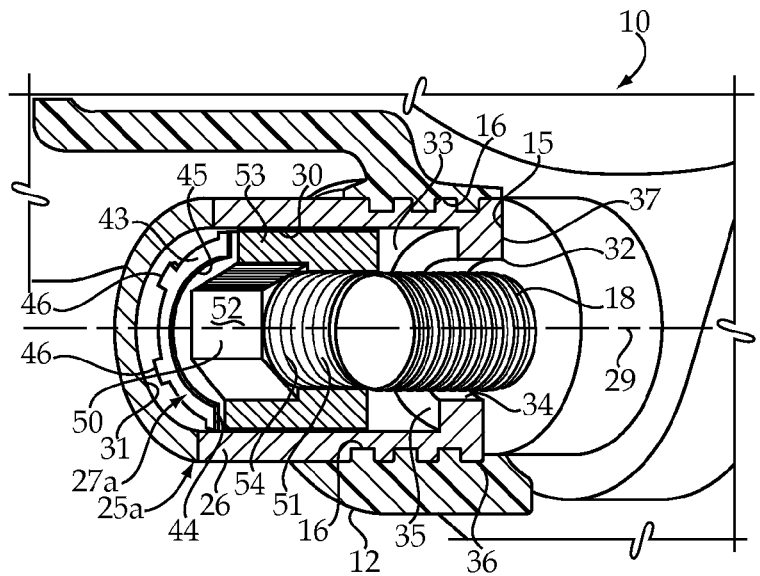
FIG. 2 is an enlarged partially sectioned view of a captive fastener assembly portion of the machine of FIG. 1.

Referring to FIGS. 1 and 2, a machine 10 includes a removable cover 12 blocking access to a maintenance feature 13. As used in the context of the present disclosure, the term "machine" means an assemblage of components, which includes moving parts, that transmit forces, motion, and energy one to another in a predetermined manner. In the illustrated embodiment, the machine is an alternator, which is a portion of another machine, namely an internal combustion engine. A "maintenance feature" means any feature of the machine for which routine maintenance is prescribed. For instance, in the illustrated embodiment the maintenance feature is the alternator belt, and the prescribed maintenance may be checking the wear state of the belt and/or tension in the alternator belt. A "removable cover" means any machine feature whose presence is not essential for the operation of the machine, but is included to protect users from moving machine components, protect machine components from the environment, or otherwise block access to a maintenance feature. Although a machine may and likely would, be equipped with machine fasteners to attach various components to one another, a removable cover is intended to be removed and reconnected to the machine when conducting maintenance, whereas other fasteners of a machine are never intended to be disconnected absent some problem requiring partial or complete dismantlement of the machine. In the illustrated embodiment, the removable cover 12 is a plastic guard that covers at least a segment of the maintenance feature 13 (alternator belt), but whose presence is not essential to the operation of the machine 10 (alternator). The removable cover 12 is attached to the machine 10 by a threaded fastener 14 that is connected to, and positioned adjacent, the maintenance feature 13. In the illustrated embodiment, the threaded fastener 14 is a pair of bolts that extend through support attachment flanges of the alternator machine 10. Thus, in the illustrated embodiment, the threaded fastener 14 of the machine includes male threads 18, but a threaded fastener of a machine 10 that included female threads would also fall within the scope of the present disclosure.

The removable cover 12 includes at least one captive fastener assembly 25 that includes a barrel 26, a retention component 27 and a captured fastener 28. In the illustrated embodiment of FIG. 1, removable cover 12 is plastic that is molded around metallic captive fastener assemblies 25a and 25b, which differ slightly in their respective constructions. In the illustrated embodiments, identically named features of different embodiments include a letter designation, such as a, b, c, d or e. In the illustrated embodiment, the captive fastener assemblies 25 each include an external attachment surface 36 in the form of a plurality of annual ribs that are in contact with a counterpart surface 16 of removable cover 12 where the plastic has been molded into and around the annular grooves. Nevertheless, those skilled in the art will appreciate that many different external attachment surfaces 36 would fall within the scope of the present disclosure depending upon many factors including, but not limited to, the material out of which the removable cover 12 is made, (e.g., plastic, sheet metal, casting) and how it is desired to attach the captive fastener assembly 25 to the removable cover, such as via over molding as shown, adhesives, welding or some mechanical attachment strategy. Regardless of which of these strategies is utilized, the captive fastener assembly 25 will always include an external attachment surface 36 that is trapped by, and/or in contact with, a counterpart surface such as counterpart surface 16 of the removable cover 12. When the removable cover 12 is connected to machine 10, an external thrust surface 37 may contact a seating surface 15 that surrounds the threaded fastener 14. In the illustrated embodiment, external thrust surface 37 is an end surface of barrel 26 of captive fastener assembly 25, but could also or alternatively be a portion of the removable cover 12 without departing from the present disclosure. In the illustrated embodiment, the barrel 26 of the captive fastener assembly 25 is affixed to the removable cover 12 by way of the removable cover being plastic molded to the external attachment surface 36. In the context of the present disclosure, the term "affixed" means that the captive fastener assembly 25 cannot be disconnected from the removable cover 12 without damage to one or the other component or damage to some attachment means, such as a broken weld or adhesive. Nevertheless, captive fastener assemblies that may be disconnected from their removable cover would also fall within the scope of the present disclosure. For instance, the external attachment surface of the captive fastener assembly could be a set of male threads that are mated to a set of female threads of the removable cover without departing from the present disclosure.

Barrel 26 includes an internal passage 30 that separates a tool opening 31 from a fastener opening 32. Internal passage 30 is divided into a cage volume 33 and a fastener passage 34 by an internal thrust surface 35. As stated earlier, the barrel also includes the external attachment surface 36, and an external thrust surface 37 that is located opposite to the internal thrust surface 35. The captive fastener assembly 25 also includes a retention component 27 that defines a tool passage 45 through a capture surface 44, which defines a portion of the cage volume 33. The retention component is mechanically mounted to a surface of the barrel that defines the internal passage at a location adjacent the tool opening 31. As used in the present disclosure, the term "adjacent" means that the location is closer to the named feature than to any other named feature. For instance, the present disclosure, the retention component 27 is located adjacent the tool opening 31, but not adjacent the internal thrust surface 35. The term "mechanically mounted" means that the captured fastener 26 can be shaken about within the cage volume 33 without dislodging the retention component 27; however, the retention component 27 can be pried out to facilitate replacement of the captured fastener 28 if needed. For instance, if the captured fastener threads should become stripped or otherwise damaged, the retention component 27 can be pried out, such as by using a screw driver allowing the captured fastener to be replaced. Thereafter, the retention component can be again mechanically mounted in the barrel 26 after the repair or replacement.

The captive fastener assembly 25a includes a retention component 27a that is a push nut 43 that is frictionally engaged to the barrel 26 at a plurality of non-contiguous locations 46 distributed around a common centerline 29. On the otherhand, the captive fastener assembly 25b includes a retention component 27b in the form of an o-ring 70 that is positioned in an annular groove 38 defined by barrel 26b. The push nut embodiment 25a may be preferred in some instances relative to the o-ring embodiment 25b by allowing the omission of an extra machining step (groove 38). In other words, the barrel 26 of the captive fastener assembly 25a may include an internal passage 30 made up of a first smooth uniform cylinder from the tool opening 31 to the internal thrust surface 35, and a second smaller diameter uniform cylinder from the internal thrust surface 35 to the fastener opening 32. The o-ring embodiment 25b requires the extra groove 38 for holding the o-ring retention component 27b.

All capture fastener assemblies 25 according to the present disclosure include a captured fastener 28 that is trapped to move between contact with the capture surface 44 of the retention component 27 and the internal thrust surface 35 of the barrel 26 in the cage volume 33. The captured fastener 28 defines an internal tool engagement surface 50, which in the illustrated embodiment is an Allen socket 52, that is oriented toward the tool opening 31. The captured fastener 28 also includes a set of threads 51, which are female threads 54 in the illustrated embodiment, that are oriented toward the fastener opening 32. Although the captured fastener 28 is illustrated as including an Allen socket 52, other internal tool engagement surface geometry, such as a screw driver slot, a Phillips screw driver cross groove, a torx star configuration, a square shaped opening or any other suitable internal tool engagement surface 50 would fall within the scope of the present disclosure. An external tool engagement surface, such as the hex head of a bolt, would not be an internal tool engagement surface according to the present disclosure. The captured fastener may have a smooth outer cylindrical surface 53 that has a guide interaction with the internal passage 30 of barrel 26 so that the threads 51 maintain an orientation with respect to common centerline 29. As used in the context of the present disclosure, a guide interaction means that the threads 51 of the captured fastener 28 will engage the threads 18 of the threaded fastener 14 when the captured fastener is pushed along centerline 29 into contact with threaded fastener 14 and simultaneously rotated in a direction that tends to engage the threads. In other words, no orientation adjustment need be done due to the small dimensional clearance between the internal diameter of the cage volume 33 and the external surface 53 of the captured fastener 28.

In the illustrated embodiments, there is no wall separating the female threads 54 from the internal tool engagement surface 50. However, an alternative captive fastener that did include a solid wall isolating the internal tool engagement surface 50 from the female threads 54 would fall within the scope of the present disclosure. In addition, in the illustrated embodiment, the Allen socket 52 is shown to be larger than the female threads 54 so that the threaded fastener 14 can enter the volume defined by internal tool engagement surface if the threaded fastener 14 is long enough. Nevertheless, an Allen socket 52 or other internal tool engagement surface 50 that was smaller than the diameter of the female threads 54 would also fall within the scope of the present disclosure.

Referring now to FIGS. 3-5, three additional embodiments of a captive fastener assembly 25c, 25d and 25e are shown illustrated. All of these versions differ from the embodiments described earlier in that they include captured fasteners 28c, 28d and 28e that all include male threads instead of female threads as in the earlier described embodiments. These embodiments also differ from the embodiments described in FIGS. 1 and 2 in that the captive fastener assemblies 25c, 25d and 25e are attached to their respective removable covers 12c, 12d and 12e in a manner that permits some freedom of movement in the plane of the removable cover as well as into and out of the same. This strategy can be useful in those instances where, because of loose tolerances or other reasons, that it may be difficult to line up the male threaded fasteners 28c, 28d and 28e with their counterpart female threaded fasteners attached to the respective machines (not shown). Thus, the embodiments of FIGS. 3-5 are all attached to their respective removable covers 12c, 12d and 12e, but not affixed as in the earlier described embodiments in order to provide some freedom of movement of the respective captive fastener assemblies 25c, 25d and 25e with respect to the removable covers 12c, 12d and 12e, respectively.

The FIG. 3 embodiment includes a retention component 27c similar to the embodiment of FIG. 2 that is mechanically mounted in a barrel 26c. Captive fastener assembly 25c achieves its freedom of movement by utilizing a spring retainer retention that includes a spring retainer 60c mechanically mounted to the external attachment surface 36c of barrel 26c. In turn, the spring retainer can bear against a shoulder of counterbore component 61c. Because the external attachment surface 36c has a much smaller diameter than the internal diameter of the bore through removable cover 12c, captive fastener assembly 25c can move in a plane defined by the panel 12c, bound only by the diameter of the bore through cover 12c. In addition, depending upon where spring retainer 60c is mounted to attachment surface 36c along centerline 29c, some limited movement of captive fastener assembly 25c with respect to removable cover 12c along common centerline 29c may also be permitted.

The embodiment of FIG. 4 shows a barrel 26d and retention member 27d as well as threaded fastener 28d that are substantially identical to the embodiment of FIG. 3. However, instead of including a counterbore component 61c as in FIG. 3, the embodiment of FIG. 4 utilizes a counterbore portion 61d that is welded to or made as a thicker portion of the removable cover 12d. Captive fastener assembly 25d may use an identical spring retainer 60d mechanically mounted to attachment surface 36d in a manner substantially identical to FIG. 3 so that the captive fastener assembly 25d can move both perpendicular to and parallel to the common centerline 29d in order to better align the threads of the threaded fastener 28d when reattaching removable cover 12d to its underlying machine (not shown).

The embodiment of FIG. 5 is similar to that of FIGS. 3 and 4 in that the captive fastener assembly 25e has some limited three axis range of motion with regard to underlying removable cover 12e. However, barrel 26e does not include a segment that extends through removable cover 12e as in the embodiments of FIGS. 3 and 4, but does include an identical retention member 27e. In the embodiment of FIG. 5, the external attachment surface 36e, which takes the form of a flange, is trapped under a bolted retainer 63 so that barrel 26e, and hence all of captive fastener 25e have some limited three axis freedom of movement with respect to common centerline 29e. In other words, bolted retainer 63 is affixed with bolts (not shown) or other fasteners such as screws to the underlying removable cover 12e via threaded fasteners (not shown) that are received through bores 64. The freedom of movement provided by these alternative embodiments of a captive fastener assembly according to the present disclosure, especially along common centerline 29, may be useful in those instances where reconnection of a removable cover 12 to a machine 10 previously required near simultaneous tightening of two or more fasteners to avoid warpage and/or breakage of the removable cover 12.

Industrial Applicability

The teachings of the present disclosure apply generally to captive fastener assemblies for any application. The present disclosure finds particular applicability to captive fastener assemblies that are portions of removable covers that block access to a maintenance feature of a machine. The present disclosure finds specific applicability to captive fastener assemblies affixed to a removable cover in order to prevent loss of fasteners when performing routine maintenance to a machine. Although the concepts of the present disclosure are illustrated in the context of a removable guard cover 12 that blocks access to an alternator belt (maintenance feature 13) of an alternator (machine 10), the disclosure is not limited to any specific machine. Although the captive fastener assembly of the present disclosure is illustrated in a form already connected to a removable cover 12, the present disclosure also specifically teaches captive fastener assemblies before the captive fastener assembly has been attached to anything, regardless of whether its end use is with a removable cover or some other feature of a machine.

Referring back to FIGS. 1 and 2, a method of servicing machine 10 includes accessing a maintenance feature 13 of the machine 10 by disconnecting a removable cover 12 from the machine. The disconnecting step includes unthreading at least one captured fastener 28 by rotating a tool (Allen wrench) inserted through a tool opening 31 of the captive fastener assembly 25. Loss of the captured fastener 28 is avoided by capturing the fastener 28 in the captive fastener assembly 25, which is affixed to the removable cover 12. The captured fastener 28 may be captured by trapping the same between a retention component 27 mechanically mounted to a barrel 26 and an internal thrust surface 35 of barrel 26. After disconnecting the removable cover 12 from the machine 10, maintenance may be performed on the maintenance feature 13. For instance, the alternator belt may be checked for wear and/or proper tensioning. After the maintenance is performed, the maintenance feature 13 is blocked from access by reconnecting the removable cover 12 to the machine 10. The reconnecting step includes inserting a tool (e.g., Allen wrench) through the tool opening 31 into engagement with the internal tool engagement surface 50 of the captured fastener 28. In the illustrated embodiment of FIG. 1, the captive fastener assembly 25a shows the captured fastener 28 before being threaded onto the threaded fastener 14 but the captive fastener assembly 25b shows the configuration after the captured fastener 28 has been threadably engaged to the threaded fastener 14. When changing from the configuration of captive fastener assembly 25a to the captive fastener assembly 25b the captured fastener 28 may be guided in its movement along centerline 29 by a contact guide interaction between the captured fastener 28 and the internal surface of barrel 26. The reconnecting step may be completed when the external thrust surface 37 comes into and is held in contact with a seating surface 15 by tightening captured fastener 28 onto threaded fastener 14. In some instance, the male threads of the threaded fastener 14 may actually enter into the Allen socket 52 if the threaded fastener 14 is long enough.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A captive fastener assembly comprising:
    a barrel with an internal passage separating a tool opening from a fastener opening, and the internal passage being divided into a cage volume and a fastener passage by an internal thrust surface, and the barrel including an external attachment surface and an external thrust surface located opposite to the internal thrust surface;
    the captive fastener assembly including a retention component that defines a tool passage through a capture surface, and being mechanically mounted to a surface that defines the internal passage at a location adjacent the tool opening; and
    the captive fastener assembly further including a captured fastener trapped to move between contact with the capture surface and the internal thrust surface in the cage volume, and the captured fastener defining an Allen socket oriented toward the tool opening and threads oriented toward the fastener opening;
    the captured fastener has a guide interaction with the barrel along a common centerline when moving between contact with the capture surface and contact with the internal thrust surface, wherein the captured fastener includes female threads.

2. The captive fastener assembly of claim 1 wherein the retention component is a push nut frictionally engaged to the barrel at a plurality of non-contiguous locations distributed around the common centerline.

3. The captive fastener of claim 1 wherein the barrel defines a first smooth uniform cylinder from the tool opening to the internal thrust surface, and a second uniform cylinder from the internal thrust surface to the fastener opening.

4. The captive fastener assembly of claim 3 wherein the retention component is a push nut frictionally engaged to the barrel at a plurality of non-contiguous locations distributed around the common centerline.

5. The captive fastener of claim 1 wherein the barrel defines a first smooth uniform cylinder from the tool opening to the internal thrust surface, and a second uniform cylinder from the internal thrust surface to the fastener opening; and
    the retention component is a push nut frictionally engaged to the barrel at a plurality of non-contiguous locations distributed around the common centerline.

6. A machine comprising:
    a maintenance feature;
    a threaded fastener connected to, and positioned adjacent, the maintenance feature;
    a removable cover blocking access to the maintenance feature and including a captive fastener assembly that includes a barrel with an internal passage separating a tool opening from a fastener opening, and the internal passage being divided into a cage volume and a fastener passage by an internal thrust surface;
    the captive fastener assembly including a retention component that defines a tool passage through a capture surface, and being mechanically mounted to a surface that defines the internal passage at a location adjacent the tool opening;
    the captive fastener assembly further including a captured fastener trapped to move between contact with the capture surface and contact with the internal thrust surface in the cage volume, and the captured fastener defining an internal tool engagement surface oriented toward the tool opening and threads oriented toward the fastener opening and engaged to the threaded fastener;
    wherein the barrel including an external attachment surface and an external thrust surface located opposite to the internal thrust surface;
    wherein the internal tool engagement surface is an Allen socket; and
    the captured fastener has a guide interaction with the barrel along a common centerline when moving between contact with the capture surface and contact with the internal thrust surface, wherein the barrel includes an external thrust surface located opposite to the internal thrust surface and being in contact with a seating surface surrounding the threaded fastener, and wherein the retention component is a push nut frictionally engaged to the barrel at a plurality of non-contiguous locations distributed around the common centerline;
    the barrel defines a first smooth uniform cylinder from the tool opening to the internal thrust surface, and a second uniform cylinder from the internal thrust surface to the fastener opening;
    the barrel is affixed to the removable cover; and
    the captured fastener includes female threads.

7. The machine of claim 6 wherein the external attachment surface is in contact with a counterpart surface of the removable cover.

8. The machine of claim 7 wherein the barrel is metallic and the removable cover is plastic molded to the attachment surface.

9. The machine of claim 6 wherein the retention component is a push nut frictionally engaged to the barrel at a plurality of non-contiguous locations distributed around the common centerline.

10. The machine of claim 6 wherein the barrel defines a first smooth uniform cylinder from the tool opening to the internal thrust surface, and a second uniform cylinder from the internal thrust surface to the fastener opening.

11. The machine of claim 6 wherein the barrel is affixed to the removable cover.

12. The machine of claim 6 wherein the Allen socket is larger than the female threads such that male threads from the threaded fastener can extend into the Allen socket when the captured fastener is in contact with the internal thrust surface.

* * * * *